United States Patent
Truyen

(10) Patent No.: US 8,548,566 B2
(45) Date of Patent: Oct. 1, 2013

(54) RENDERING METHOD AND APPARATUS

(75) Inventor: Roel Truyen, Turnout (BE)

(73) Assignee: Koninklijke Philips N.V., Eindhoven (NL)

( * ) Notice: Subject to any disclaimer, the term of this patent is extended or adjusted under 35 U.S.C. 154(b) by 957 days.

(21) Appl. No.: 12/090,889

(22) PCT Filed: Oct. 2, 2006

(86) PCT No.: PCT/IB2006/053587
§ 371 (c)(1),
(2), (4) Date: Apr. 21, 2008

(87) PCT Pub. No.: WO2007/046019
PCT Pub. Date: Apr. 26, 2007

(65) Prior Publication Data
US 2008/0228067 A1    Sep. 18, 2008

Related U.S. Application Data

(60) Provisional application No. 60/729,458, filed on Oct. 21, 2005.

(51) Int. Cl.
*A61B 5/05*     (2006.01)
*G06K 9/00*     (2006.01)

(52) U.S. Cl.
USPC .......................................... 600/425; 382/131

(58) Field of Classification Search
USPC ....................................................... 382/131
See application file for complete search history.

(56) References Cited

U.S. PATENT DOCUMENTS

| | | |
|---|---|---|
| 5,782,762 A | 7/1998 | Vining |
| 5,891,030 A | 4/1999 | Johnson et al. |
| 5,920,319 A | 7/1999 | Vining et al. |
| 5,971,767 A | 10/1999 | Kaufman et al. |
| 6,083,162 A | 7/2000 | Vining |
| 6,272,366 B1 | 8/2001 | Vining |
| 6,331,116 B1 | 12/2001 | Kaufmann et al. |
| 6,343,936 B1 | 2/2002 | Kaufman et al. |
| 6,366,800 B1 | 4/2002 | Vining et al. |
| 6,514,082 B2 | 2/2003 | Kaufman et al. |
| 6,522,324 B1 | 2/2003 | Bosma et al. |
| 6,694,163 B1 | 2/2004 | Vining |
| 6,909,913 B2 | 6/2005 | Vining |
| 7,747,055 B1 * | 6/2010 | Vining et al. ............... 382/131 |
| 8,031,921 B2 * | 10/2011 | Manduca et al. ............ 382/128 |
| 2002/0193687 A1 | 12/2002 | Vining et al. |

FOREIGN PATENT DOCUMENTS

| | | |
|---|---|---|
| EP | 1455307 A1 | 9/2004 |
| WO | 0178017 A2 | 10/2001 |
| WO | 03086172 A2 | 10/2003 |

OTHER PUBLICATIONS

U.S. Appl. No. 60/652,679, filed on Feb. 14, 2005.*
Lakare S., et al., "3D Digital Cleansing Using Segmentation Rays," Annual IEEE Conf. on Visualization, Los Alamitos, CA: IEEE Comp. Soc, US, 2000, pp. 37-44.
Zigang Wang, et al., "An Improved Electronic Colon Cleansing Method for Detection of Polyps by Virtual Colonoscopy," Engineering in Medicine and Biology Society, 2005, IEEE-EMBS 2005. 27th Annual Intl Conf. of Shanghai China, pp. 6512-5=6515.
Dongqing Chen, et al., "A Novel Approach to Extract Colon Lumen from CT Images for Virtual Colonoscopy," IEEE Transactions on Medical Imaging, IEEE Service Center, Piscataway, NJ, US 2000; 19(12) Abstract pp. 1222-1223.

* cited by examiner

Primary Examiner — Kee M Tung
Assistant Examiner — Sing-Wai Wu

(57) ABSTRACT

A rendering method uses volumetric data (202) indicative of the interior of an object to render a surface (102). Locations in the volumetric data (202) having a first parameter are identified. Regions on the rendered surface (102) which are located in proximity to the identified locations are highlighted, for example by using different visuals.

16 Claims, 2 Drawing Sheets

RENDERING METHOD AND APPARATUS

CROSS REFERENCE TO RELATED APPLICATIONS

Figure 1A:
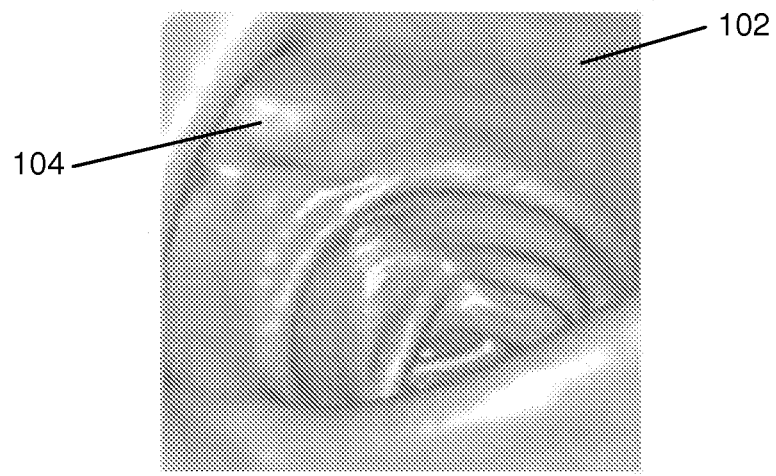

This application claims the benefit of U.S. provisional application Ser. No. 60/729,458 filed Oct. 21, 2005, which is incorporated herein by reference.

The present invention finds particular application to medical imaging, and more particularly to the rendering of anatomical structures such as the colon. It also finds application in other imaging applications in which it is desirable to highlight regions of interest on a rendered image.

Virtual endoscopy has been used as an aid to visualizing the interior of a lumen such as the human colon or trachea. In imaging of the colon, for example, it is desirable to identify suspicious masses such as polyps which may be indicative of early stage cancers. Using data obtained from computed tomography (CT) scan or other scan of the colon, one or more three dimensional rendered views of the interior of the colon have been presented, typically from a number of viewpoints as the user navigates through the colon lumen. A clinician uses the rendered images to identify polyps or other suspicious masses.

Residual stool, liquids, or other materials remaining in the colon can sometimes be difficult to distinguish from colonic tissue. In CT imaging, for example, the residual materials can have radiation attenuation values similar to those of surrounding tissues. As a result, these residual materials can sometimes mimic or obscure polyps.

To address this issue, various bowel preparation techniques have been implemented. In the case of CT imaging, these techniques have typically included the administration of an oral contrast media containing a radio-opaque substance such as barium. The intention is that material remaining in the colon will be highlighted by the contrast material.

One type of bowel preparation is the so-call wet preparation, in which large amounts of residual fluids often remain. Another type of bowel preparation are so-called dry preparations, in which the residual material is dominated by opacified stool, often concentrated in balls or clumps near the colon wall.

In a wet preparation, the tagged fluid and stool can obscure polyps and other lesions. In a dry preparation, the tagged materials can mimic them. More particularly, the remaining stool can appear as polyp-like blobs in the rendered image. A scan may also include residual materials which obscure portions of the colon wall as well as residual materials which mimic polyps or lesions. In any case, their presence can lead to confusion and result in additional workload for the clinician, who must typically evaluate and discard them.

Aspects of the present invention address these matters, and others.

According to one aspect of the present invention, a method includes using volumetric data indicative of the interior of an object to render a surface, identifying a location in the volumetric data having a first parameter value, identifying a region of interest on the rendered surface as a function of the relative positions of the rendered surface and the identified location, and generating a human readable image of the rendered surface with the region of interest highlighted thereon.

According to another aspect of the invention, an apparatus includes means for using volumetric data indicative of the interior of an object to render a surface, means for identifying a location in the volumetric data having a first parameter value, means for identifying a region of interest on the rendered surface as a function of the relative positions of the rendered surface and the identified location, and means for generating a human readable image of the rendered surface (102) with the region of interest highlighted thereon.

According to another aspect of the invention, a computer readable storage medium contains instructions which, when executed by a computer, cause the computer to carry out a method including using volumetric data indicative of the interior anatomy of a human to render a surface indicative of an interior of the colon, identifying a region of the rendered surface which is suspected to include residual stool, and highlighting the identified region on an image of the rendered surface.

Those skilled in the art will appreciate still other aspects of the present invention upon reading and understanding the attached figures and description.

Figure 1B:
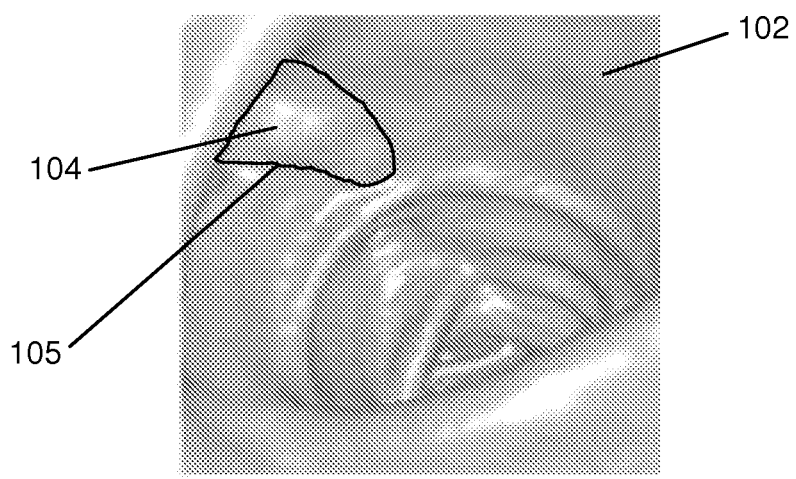

The present invention is illustrated by way of example and not limitation in the figures of the accompanying drawings, in which like references indicate similar elements and in which:

FIGS. 1*a* and 1*b* are rendered views of the interior of the colon.

Figure 2:
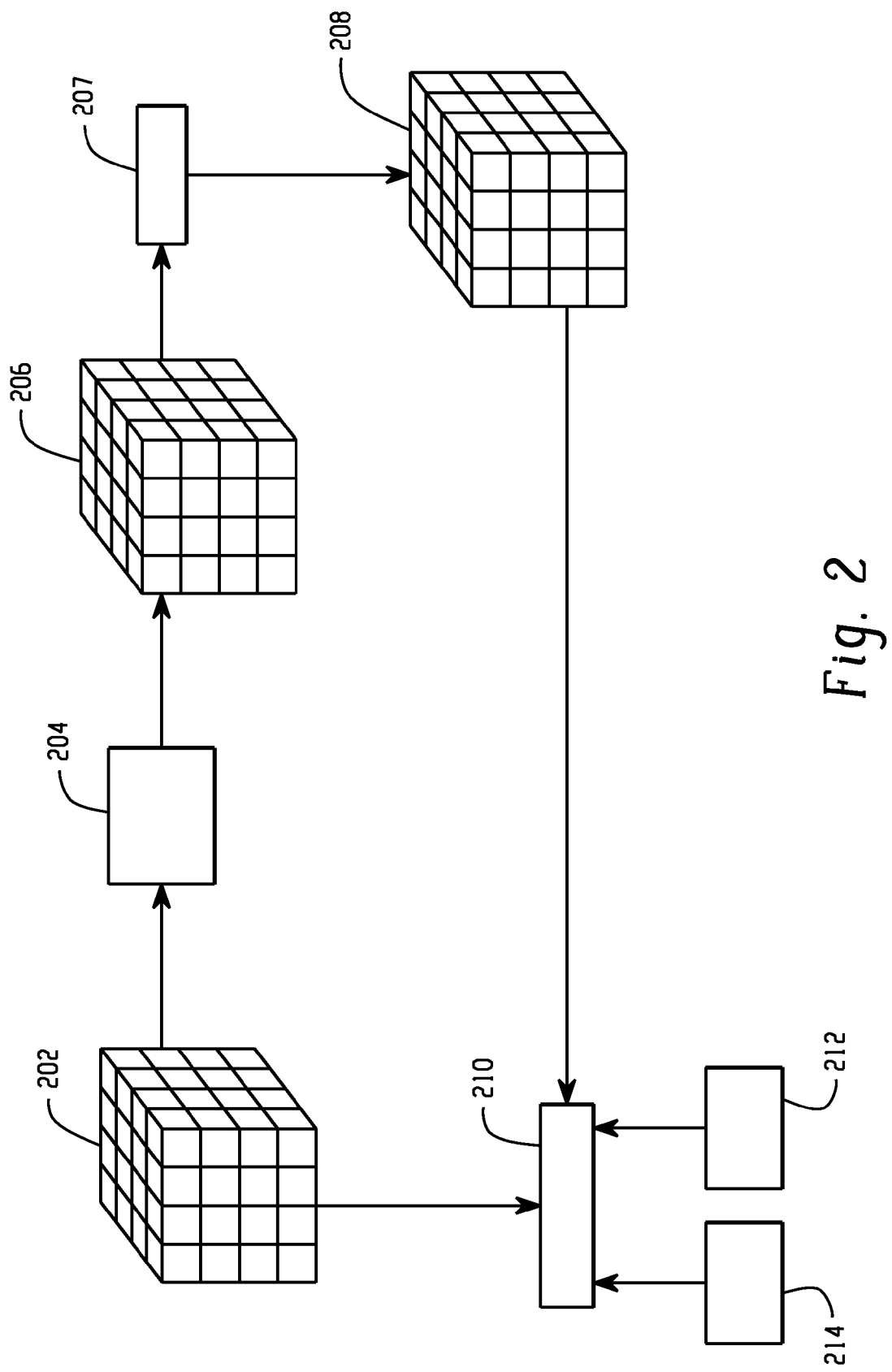

FIG. 2 is a data flow diagram of an electronic tagging technique.

FIG. 1 depicts a rendering of the interior of the colon 102 based on volumetric data obtained from a CT scan and rendered according to a prior art rendering technique. More particularly, the colon 102 as rendered as an isosurface having a desired voxel value. A region 104 appears as a suspicious polyp or lesion. However, a more thorough examination of the data set would reveal that the region 104 is likely to contain residual, opacified stool which mimics a polyp. The opacified stool is characterized by a radiation attenuation which is greater than the surrounding colonic tissue and/or mucosa. When rendered from a viewpoint inside the lumen, partial volume effects near the surface of the opacified stool result in the region 104 being rendered as part of the colon wall. As a result, the region 104 is difficult to distinguish from a polyp.

FIG. 1*b* depicts a second rendering of the same data set wherein the region 104, which is suspected of including a residual material, is electronically tagged or highlighted for presentation to the user. As illustrated, the region 104 is denoted by a contour-like line 105. In another example, the region 104 is displayed in a different color than the remainder of the colon 102. Of course, other colors or highlighting techniques may be used, for example the use of shading, surface texture, arrows or text, either individually or in various combinations. To simplify the task of viewing and evaluating the rendered image, it is generally desirable that the tagging draw the user's attention to the suspect area 104 without substantially obscuring it in the rendered image 102.

The rendering process will now be described in relation to FIG. 2. A volumetric data set 202 such as a data set generated by a CT scanner following a suitable bowel preparation is obtained. In an embodiment especially well suited to identifying residual material which resembles polyps, a dry bowel preparation is performed.

The data set 202 can be visualized as an x, y, z array of voxels containing information on one or more physical characteristics of the object, such as its radiation attenuation. Radiation attenuation is traditionally expressed in Hounsfield Units (HUs), in which air has a value of −1000 HU and water has a value of 0 HU. Still greater values represent still greater radiation attenuation values.

At 204, voxels suspected of containing residual materials are identified. This may be accomplished by segmenting the data set 202 according to voxel value to generate a segmented data set or binary volume 206. In an example suitable for imaging the colon, segmentation is performed via thresholding to identify voxels which could be expected to contain residual materials. In one example, the threshold is set at +200 HU.

To avoid highlighting noise or regions which are not of clinical interest, segmented regions smaller than a desired threshold size may be discarded. Thus, for example, if a segmented regions smaller than the lower bound of a clinically relevant polyp (approximately 5 mm diameter) can be discarded.

At 207, the segmented data set 206 is dilated to generate a dilated data set or binary volume 208. In one example, a third order dilation is performed. More particularly, background or unsegmented voxels that touch the segmented data set are added to the dilated data set 208. In a third order dilation, this process is repeated three times. As will be described below, lower or higher order dilations may also be performed.

At 210, the data set 202 is used to render the desired region of the colon 102 according to a suitable rendering technique, typically from a viewpoint located inside the colon lumen. Such locations will typically have Hounsfield values at or near the value for air. In one such technique, an explicit segmentation operation is performed on the data set 202 to generate a segmented data set. The segmented data is used to approximate a surface, which is typically represented as a polygonal mesh. An example of such a technique is presented in U.S. Pat. No. 6,083,162 to Vining, entitled Method and System for Producing Interactive, Three-Dimensional Renderings of Selected Body Organs Having Hollow Lumens to Enable Simulated Movement Through the Lumen. In another technique, the location of the isosurface is calculated directly during the rendering process. For a given ray passing through the data set, the location of the voxel at which the ray passes through the desired isosurface value is determined. The location and orientation of the isosurface is obtained by interpolating the values of the surrounding voxels. An example of such a technique is presented in U.S. Pat. No. 6,522,324 to Bosma, entitled Deriving an Iso-Surface in a Multi-Dimensional Data Field. In one embodiment, the colon 102 is rendered as a surface having a radiation attenuation value of −800 HU.

As noted above, the rendering process can cause residual opacified materials to mimic the appearance of the rendered surface 102. When viewed from the perspective of the viewpoint, voxels in the data set 202 containing residue will be found behind the rendered colon 102, with the distance depending largely on the radiation attenuation of residual material, the selected thresholds, and voxel size. Other relatively attenuative materials such as bone are located still farther from the colon 102.

The order or number of the dilations performed at 207 is selected so that voxels indicative of residue can be expected to intersect the rendered colon 102, while bone and other materials are not. Stated another way, voxels in the dilated data set 208 resulting from residual materials can be expected to be located at or in front of the rendered colon 102 when viewed from the perspective of the viewpoint. Regions at which the dilated data set 208 intersects the rendered colon 102 are highlighted, for example by displaying them in a different color.

In an implementation in which the colon 102 is rendered using a ray casting technique, a first set of visuals or display attributes 212 (for example, a first color or range of colors) is assigned to the voxels of the dilated data set 208. A second set of visuals 214 (for example a second color or range of colors) are assigned to the rendered colon 102. As each ray is traversed, the colon 102 is located and displayed using one of the visuals 212, 214. However, the visuals 212 indicative of the suspect voxels take priority over visuals 214 indicative of the rendered colon 102. Accordingly, areas in which the dilated data set 108 intersects the rendered colon 102 are displayed using the first set of visuals 212.

In another implementation, the desired visuals are predetermined prior to rendering. Of course, still other implementations are possible.

The rendered surface 102, together with the highlighted regions 104 are displayed on a human readable device such as a monitor or display. The rendering is typically performed from each of a plurality of viewpoints or locations as the user moves through the colon lumen.

As noted above, areas 104 suspected of containing residue can be identified using dilation technique. In an alternate technique, the distance between the rendered colon 102 and segmented data set 106 can be calculated directly, either prior to or concurrently with the rendering process. The desired visuals are applied the rendered colon 102 based on the calculated distance.

While the above discussion has focus on data sets generated by CT scanners, the technique can also be used in conjunction with data sets generated by other modalities, for example magnetic resonance imaging, ultrasound, single photon emission computed tomography (SPECT), positron emission tomography (PET), and the like. The techniques are also applicable to imaging of body parts other than the colon. They are also not limited to the highlighting of residual material, but can also be used in situations where material of interest is suspected of being obscured or mimicked by a rendered surface.

The described technique can be embodied in a computer readable instructions, using specialized hardware, or a combination of both. The instructions may be stored in one or more computer readable storage media, such as non-alterable or alterable read only memory (ROM), random access memory (RAM), alterable or non alterable compact disks, DVD, on a remote computer and conveyed to the host system by a communications medium such as the internet, phone lines, wireless communications, or the like. When executed by a computer, the instructions cause the processors to carry out the described technique.

Of course, modifications and alterations will occur to others upon reading and understanding the preceding description. It is intended that the invention be construed as including all such modifications and alterations insofar as they come within the scope of the appended claims or the equivalents thereof.

The invention claimed is:

1. A method, comprising:
obtaining volumetric data indicative of an anatomical structure and a residual material on the anatomical structure in a subject, wherein the residual material has a radiation attenuation that is higher than a radiation attenuation of the anatomical structure;
generating binary data by segmenting voxels representing the residual material from the volumetric data by thresholding the volumetric data with a threshold value corresponding to the radiation attenuation of the residual material and greater than the radiation attenuation of the anatomical structure;
generating dilated binary data by adding unsegmented voxels touching the segmented voxels of the binary data to the binary data;
assigning a first set of visuals or display attributes to the dilated binary data;
assigning a second set of visuals or display attributes to the volumetric data;

calculating a distance between the rendered surface and the binary data;

applying the first and second set of visuals or display attributes based on the distance; and rendering a surface of the anatomical structure from a viewpoint located inside the anatomical structure based on both the volumetric data and the dilated binary data, wherein voxels of the dilated binary data that are indicative of the residual material and that intersect the rendered surface, when viewed from a perspective of the viewpoint, are visually highlighted on the rendered surface.

2. The method of claim 1, wherein the first set visuals or display attributes is a first color or color range and the second set visuals or display attributes is a second color or color range.

3. The method of claim 2, wherein the surface is rendered by ray-casting.

4. The method of claim 3, wherein as each ray is traversed, the anatomical structure is located and displayed using one of the first or second set of visuals or display attributes.

5. The method of claim 4, wherein the first set of visuals or display attributes are given visual priority over the second set of visuals or display attributes, thereby areas of the rendered surface where the dilated binary data intersect the anatomical structure are displayed using the first set of visuals or display attributes.

6. The method of claim 1, wherein the first and second set of visuals or display attributes are determined prior to the rendering.

7. The method of claim 1, wherein the anatomical structure is the colon and the residual material is opacified stool.

8. The method of claim 1, further comprising:

comparing regions of voxels in the binary data with a size threshold; and removing a region of voxels having a size smaller than the size threshold from the binary data.

9. A non-transitory computer readable storage medium embedded with computer readable instructions, which, when executed by a computer, cause the computer to:

obtain volumetric data of an anatomical structure and a residual material in a subject, wherein the residual material has a radiation attenuation that is higher than a radiation attenuation of the anatomical structure of interest;

generate binary data by segmenting voxels representing the residual material from the volumetric data by thresholding the volumetric data with a threshold value corresponding to the radiation attenuation of the residual material and greater than the radiation attenuation of the anatomical structure of interest;

generate dilated binary data by adding unsegmented voxels touching the segmented voxels of the binary data to the binary data;

assign a first set of visuals or display attributes to the dilated binary data;

assign a second set of visuals or display attributes to the volumetric data;

calculate a distance between the anatomical structure and the binary data;

apply the first and second set of visuals or display attributes based on the distance; and render a surface of the anatomical structure from a viewpoint located inside the anatomical structure based on both the volumetric data and the dilated binary data, wherein voxels of the dilated binary data that are indicative of the residual material and that intersect the rendered surface, when viewed from a perspective of the viewpoint, are visually highlighted on the rendered surface.

10. The non-transitory computer readable storage medium of claim 9, wherein the first set visuals or display attributes is a first color or color range and the second set visuals or display attributes is a second color or color range.

11. The non-transitory computer readable storage medium of claim 10, the computer readable instructions, further causing the computer to:

render the surface using ray-casting.

12. The non-transitory computer readable storage medium of claim 11, wherein as each ray is traversed, the anatomical structure is located and displayed using one of the first and second set of visuals or display attributes.

13. The non-transitory computer readable storage medium of claim 12, wherein visuals corresponding voxels representing the residual material are given visual priority over voxels representing the anatomical structure, thereby areas of the rendered surface where the dilated binary data intersect the anatomical structure are display using the first set of visuals or display attributes.

14. The non-transitory computer readable storage medium of claim 9, wherein the first and second set of visuals or display attributes are determined prior to the rendering.

15. The non-transitory computer readable storage medium of claim 9, the computer readable instructions, further causing the computer to:

compare regions of voxels in the binary data with a size threshold; and remove a region of voxels having a size smaller than the size threshold from the binary data.

16. An apparatus, comprising:

means for obtaining volumetric data of an anatomical structure of interest and a residual material inside a subject, wherein the residual material has a radiation attenuation that is higher than a radiation attenuation of the anatomical structure of interest;

means for generating binary data by segmenting voxels representing the residual material from the volumetric data by thresholding the volumetric data with a threshold value corresponding to the radiation attenuation of the residual material and greater than the radiation attenuation of the anatomical structure of interest;

means for generating dilated binary data by adding unsegmented voxels touching the segmented voxels of the binary data to the binary data;

means for assigning a first set of visuals or display attributes to the dilated binary data;

means for assigning a second set of visuals or display attributes to the volumetric data;

means for calculating a distance between the anatomical structure and the binary data;

means for applying the first and second set of visuals or display attributes based on the distance; and means for rendering a surface of the anatomical structure from a viewpoint located inside the anatomical structure based on both the volumetric data and the dilated binary data, wherein voxels of the dilated binary data that are indicative of the residual material and that intersect the rendered surface, when viewed from a perspective of the viewpoint, are visually highlighted on the rendered surface.

* * * * *